United States Patent [19]
Brockman

[11] Patent Number: 5,979,123
[45] Date of Patent: Nov. 9, 1999

[54] PROTECTIVE SHIELD FOR BUILDING CONSTRUCTION

[76] Inventor: Robert D. Brockman, 9657 Ilex Cir. S., Palm Beach Gardens, Fla. 33410

[21] Appl. No.: 09/170,180

[22] Filed: Oct. 13, 1998

[51] Int. Cl.[6] ............................... E04B 1/72; E04H 9/16
[52] U.S. Cl. ........................ 52/101; 52/302.6; 52/293.3; 52/517; 52/97; 49/58; 119/61
[58] Field of Search .................................. 52/101, 58, 62, 52/208.1, 302.1, 302.6, 292, 293.3, 517, 97, 293.1, 712; 49/58; 119/61

[56] References Cited

U.S. PATENT DOCUMENTS

| | | |
|---|---|---|
| 2,092,659 | 9/1937 | Stone . |
| 2,176,598 | 10/1939 | Tennison et al. . |
| 2,242,266 | 5/1941 | Scales . |
| 2,720,051 | 10/1955 | Line . |
| 2,859,487 | 11/1958 | Tonnon et al. . |
| 3,089,282 | 5/1963 | Tennison . |
| 4,404,769 | 9/1983 | Casbeer, Jr. ................................ 49/58 |
| 5,097,641 | 3/1992 | Hand et al. .............................. 52/101 |
| 5,303,523 | 4/1994 | Hand et al. .............................. 52/101 |
| 5,630,297 | 5/1997 | Rutherford ................................ 52/58 |

Primary Examiner—Christopher T. Kent
Assistant Examiner—Yvonne Horton-Richardson
Attorney, Agent, or Firm—Jack N. McCarthy

[57] ABSTRACT

A protective shield formed of sheet material is provided for placing between the wood-to-concrete foundation interface of a building. A portion of the shield positions the lower edge of a substrate siding and a finish layer. A sealant is provided between the sheet material and the concrete foundation.

11 Claims, 6 Drawing Sheets

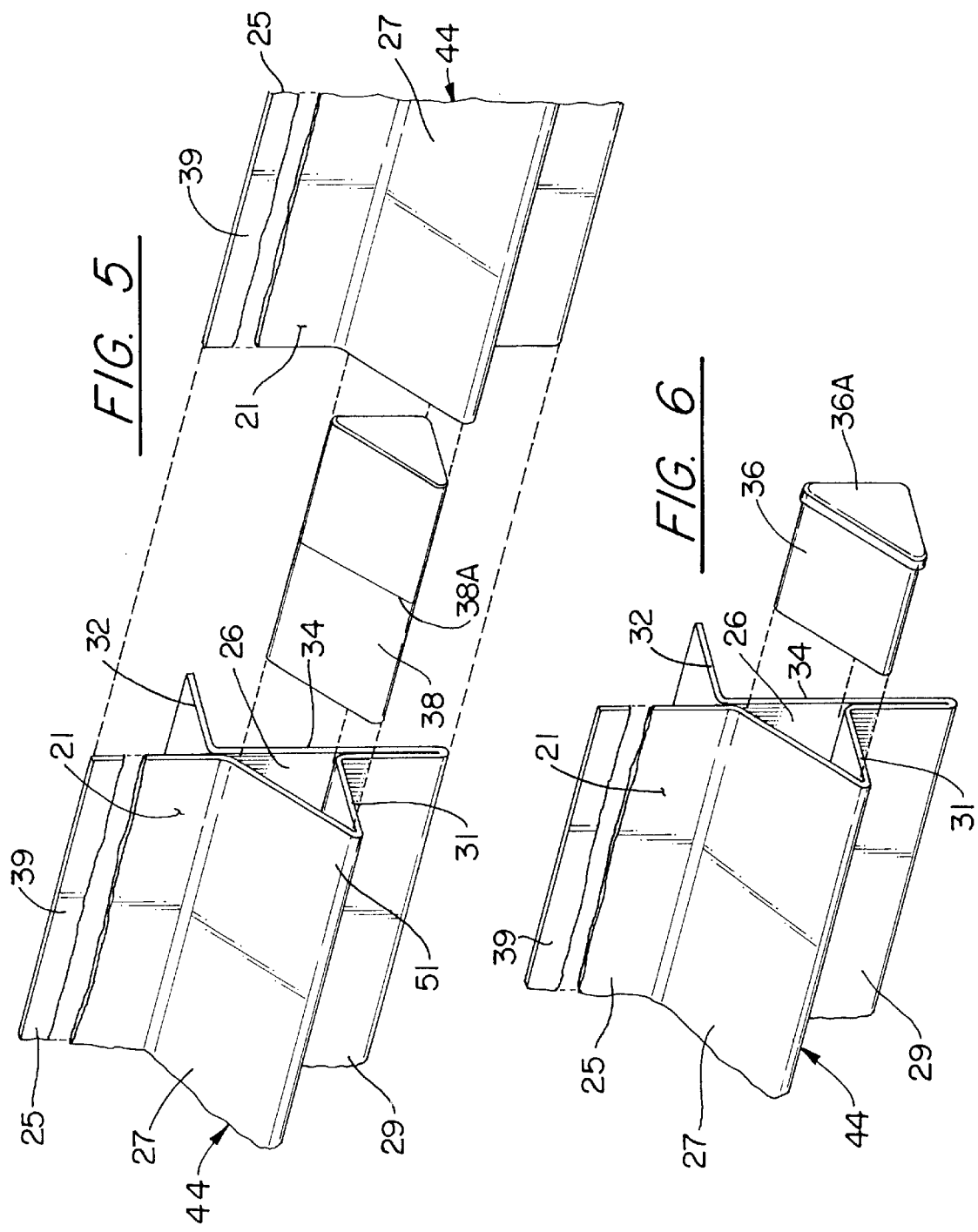

PROTECTIVE SHIELD FOR BUILDING CONSTRUCTION

TECHNICAL FIELD

This invention relates to protection for the structure of a building for invasion of termites and other vermin.

BACKGROUND ART

Existing methods of construction, as shown in FIG. 2, permit termite penetration into structures and dwellings. Other patents setting forth a background for this invention are: U.S. Pat. Nos. 494,848; 2,112,229; 2,144,700; 2,315,989; 2,720,051; 2,859,487; and 5,097,641.

DISCLOSURE OF INVENTION

This invention is a shield including prefabricated lengths, corners, couplings and related fittings, for in-the-field assembly. This invention will supply a continuous shield around the perimeters of structures at the outer edge of the foundation and provides an apparatus for deterring subterranean termites, insects, and vermin from entering the structures at their most frequent point of entry, at the connection of the building's exterior wall to the foundation.

An object of the invention is to improve construction methods so as to protect, prevent, and increase the integrity of the exterior sheathing or substrate from water damage by providing a controlled stopping surface with an air space.

Another object of the invention is to give the homeowner a visual aid to determine infestation attempts by subterranean termites and the like. This is achieved by the manner of installation and the resulting ease of visual inspection for termite tunnels between the earth and the bottom edge of the shield along the vertical face of the foundation's exterior side.

A further object of the invention is the anchoring and sealing capabilities of the device. When installed, this device can be installed for anchoring the exterior wall studs to the base plate with code compliant fasteners. With a properly specified sealant such as a polyurethane sealant, or its equivalent, between the device and the concrete foundation edge, a barrier is created to help eliminate insects from gaining access into the interior of the building. An effective sealant is PR-255® of OSI®.

Another object of the invention is to have a finished construction product to effectively serve several design practices.

These and other objects are achieved in assembly of the shield which is securely bonded to the associate structure and positioned between the ground and the structure's wood to concrete foundation.

BRIEF DESCRIPTION OF THE DRAWINGS

FIG. 5 shows a view of the coupling component for connecting lengths of the shield to form a continuous longer length;

FIG. 6 shows a view of the termination plug to be placed at the end of a continuous length of the shield for a door's entry and the like;

BEST MODE FOR CARRYING OUT THE INVENTION

Figure 1:
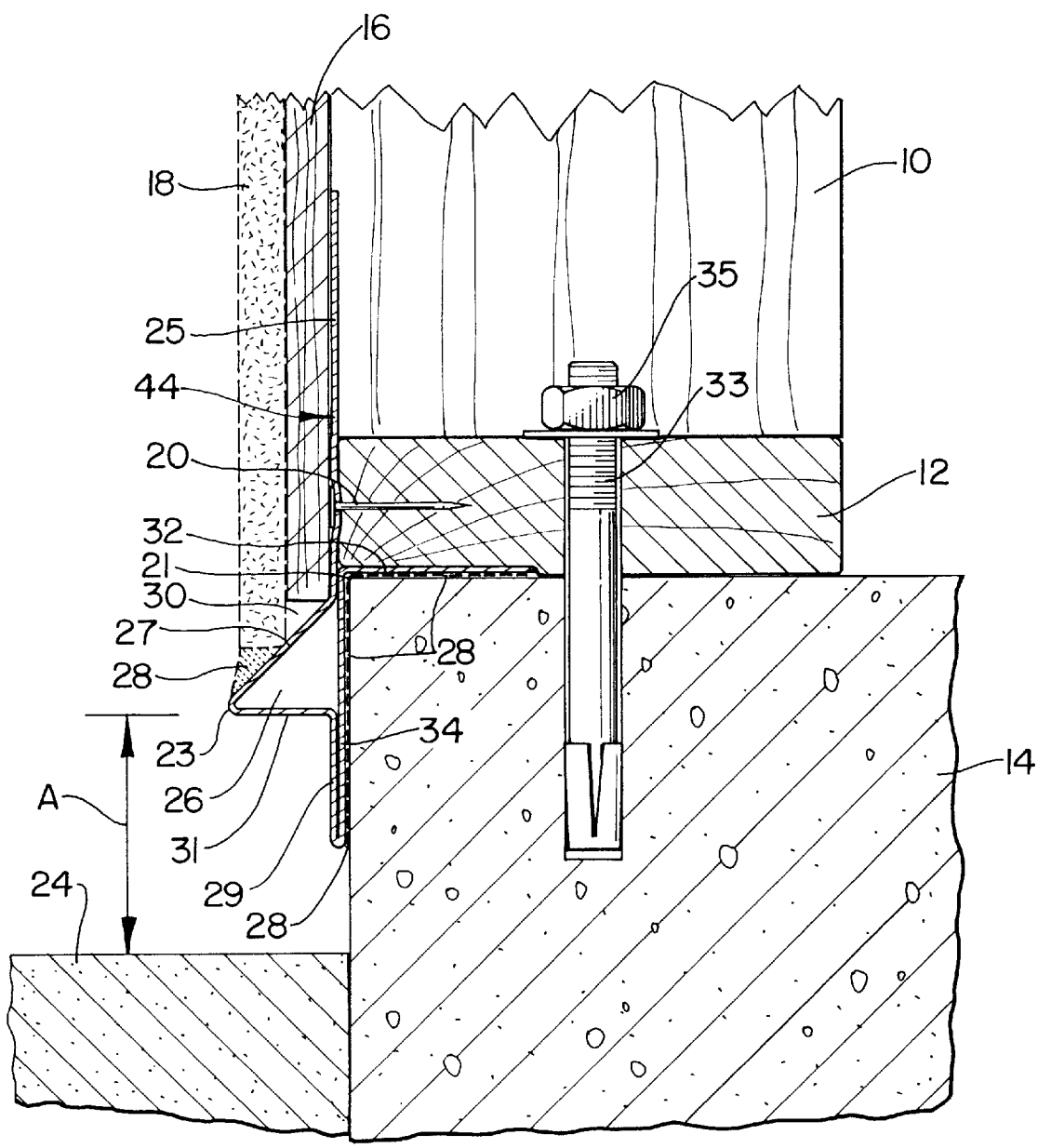
FIG. 1 shows a cross-section of the invention when installed in a vertical wall stud location, with related components to form a finished assembly.
Figure 2:
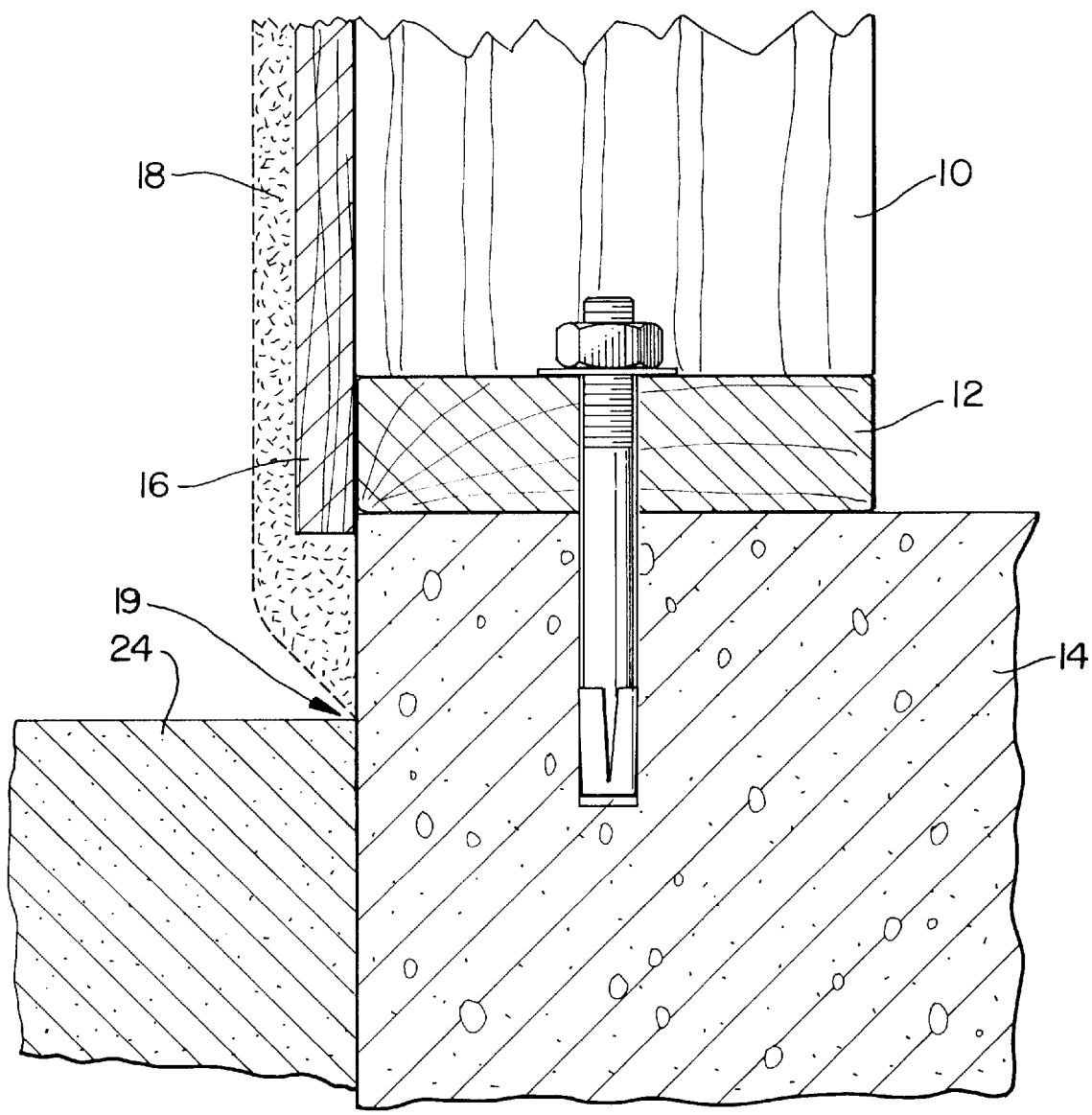
FIG. 2 shows a typical construction method which fails to prevent infiltration of subterranean termites in a building's envelope at the foundation edge with stucco or cladding shown within a dashed envelope.

In FIG. 1, a cross-section of the shield 44 is shown with the shield 44 installed. The components of the shield 44 are each formed by bending a sheet of galvanized metal, or high impact plastic, to resist deterioration from the elements. All related and pre-engineered components of the shield 44, as identified herein, have a design shape to rest both horizontally and vertically on the outside corner of the concrete footing, slab, or foundation 14.

All related components of the shield 44 are bent to form an upstanding section 25 which extends into an outwardly extending sloped section 27 at its bottom end. The sloped section 27 has a bend at its end forming a projecting nose 23 which connects to a horizontal section 31. The horizontal section 31 is bent at its inner end to have a vertical section 29 extending downwardly below and substantially in line with section 25. The downward end of section 29 is bent upwardly against itself, forming section 34 which extends upwardly to overlap the bottom of section 25. At the top of section 34 the sheet is bent away from the section 25 at an angle of 90°, forming a horizontal flange 32. The shield 44 has section 25 spot-welded to section 34 where they meet to maintain the shape of the shield 44 while it is being handled and properly installed. The components of the shield 44 consist of straight lengths 39, inside corners 40 outside corners 42, end caps 36, and couplings 38.

A polyurethane sealant 28, or its equivalent, is placed around the outside edge of the foundation 14 to receive the horizontal flange 32 and the vertical section 34 of the shield 44. The 2×4, or larger bottom plate 12, is now placed on top of the shield 44 and covers the horizontal flange 32, placing the outer end of the bottom plate 12 against the bottom of the upstanding section 25. The bottom plate 12 is now fastened with a code compliant system of bolts 33, with nuts and washers 35, spaced at pre-engineered dimensions. The slope 27 provides a bottom stopping point for a substrate 16, and a stopping point for cladding, or stucco, 18. This construction creates an air space 30 to avoid wicking, or absorption, of moisture into the substrate 16. The exterior finish 18, being of either wood or stucco, will stop at slope 27 and receive a sealant 28 for protection from weather elements, vermin, or termite infestation. The projecting nose 23 will act as a visual reference point to the ground or earth 24. This reference point will guage the distance by sight to prevent the ground elevation 24 from coming in contact with the wood siding, or stucco, 18.

The assembly of exterior walls with studs 10 can be installed and the upstanding section 25 of the shield 44 can be fastened with proper nails 20 at the bottom wood plate 12 for strength and rigidity. The exterior substrate 16 can now be applied, resting on the slope 27 and creating the air space 30. The exterior finish 18 can now be applied over substrate 16, resting on the slope 27 creating the air space for receiving the sealant 28. This complete installation method, with the design of shield 44, will reduce the frequent deterioration of the bottom edge of exterior cladding, or stucco, finishes. The horizontal section 31 acts as a finished non-penetrating ledge which bends further into a vertical section 29. This vertical section 29 extends straight downwardly to lay flat against the section 34 which is bent upwardly against vertical section 29 for strength. The section 34 overlaps upstanding section 25 where it is spot welded at 21, the section 34 then bends away from upstanding section 25 where it extends as horizontal section 31. This section 34 rests against the foundation exterior wall.

Figure 3:
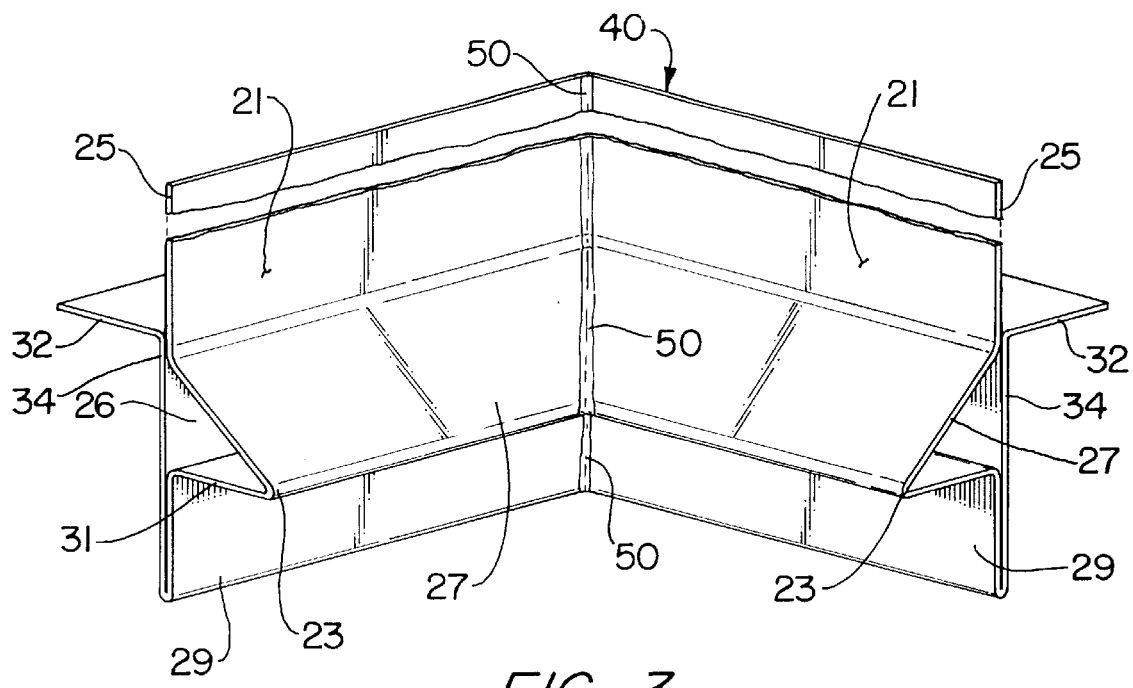
FIG. 3 shows an isometric view of an inside corner unit which is part of the shield assembly.
Figure 4:
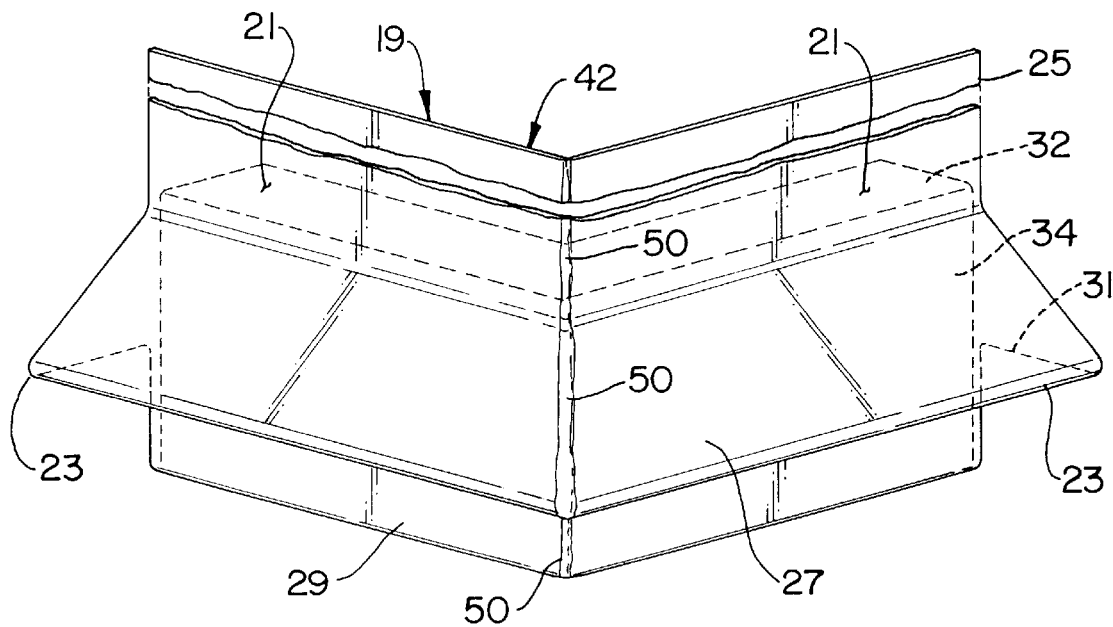
FIG. 4 shows an isometric view of an outside corner unit which is part of the shield assembly.

The shield 44 has inside corner units 40 and outside corner units 42 (see FIG. 3 and FIG. 4) which are made from the same material as the straight lengths of the shield 44. These corner units 40 and 42 are shaped to the exact sizes and dimensions as the straight shield including the vertical sections 25, 29 and 34 with the projecting nose 23. The meeting ends of the shield sections forming the inside corner unit 40 and outside corner unit 42 are fixed together, such as by welding at 50. The exact shape of the sloped section 27 and the projecting nose 23 will insure correct matching fits during assembly. The hollow space 26 in the projecting nose 23 is designed for the acceptance of coupling units 38 and end cap units 36 as shown in FIG. 5 and FIG. 6.

The pre-manufactured solid plastic coupling units 38 will slide into both meeting spaces 26 during assembly to form a continuous shield 44. A holding technique uses a slight ridge 38A on a coupling unit 38 to indicate the center of the coupling unit 38 to insure an even distribution of the coupling unit 38 into each meeting space 26. In assembly, the slight ridge 38A will squeeze into the opening of space 26, making a tight fit indicating proper positioning of the coupling unit 38.

The end of the coupling unit 38 first pushed into a space 26 can be covered with an adhesive to adhere to the inner surface of the space 26. Further, a short screw can be placed at an area 51 (see FIG. 5) through the end of a projecting nose 23 into the inserted end of a coupling unit 38 to hold it in place. If desired, an indentation could be made in the projecting nose 23 to limit the distance that a coupling unit 38 could be inserted therein. The other meeting space 26 of the continuing shield 44 can then be pushed over the extending portion of the coupling unit 38. An adhesive can also be used along with a short screw 51 to hold the shield section to the coupling unit 38.

End cap units 36 will provide the finished edge to a doorway entrance or the like. The plastic end cap units 36 will have an edge 36A to properly position the end cap units 36 into the opening 26 of the end of the shield 44.

Figure 7:
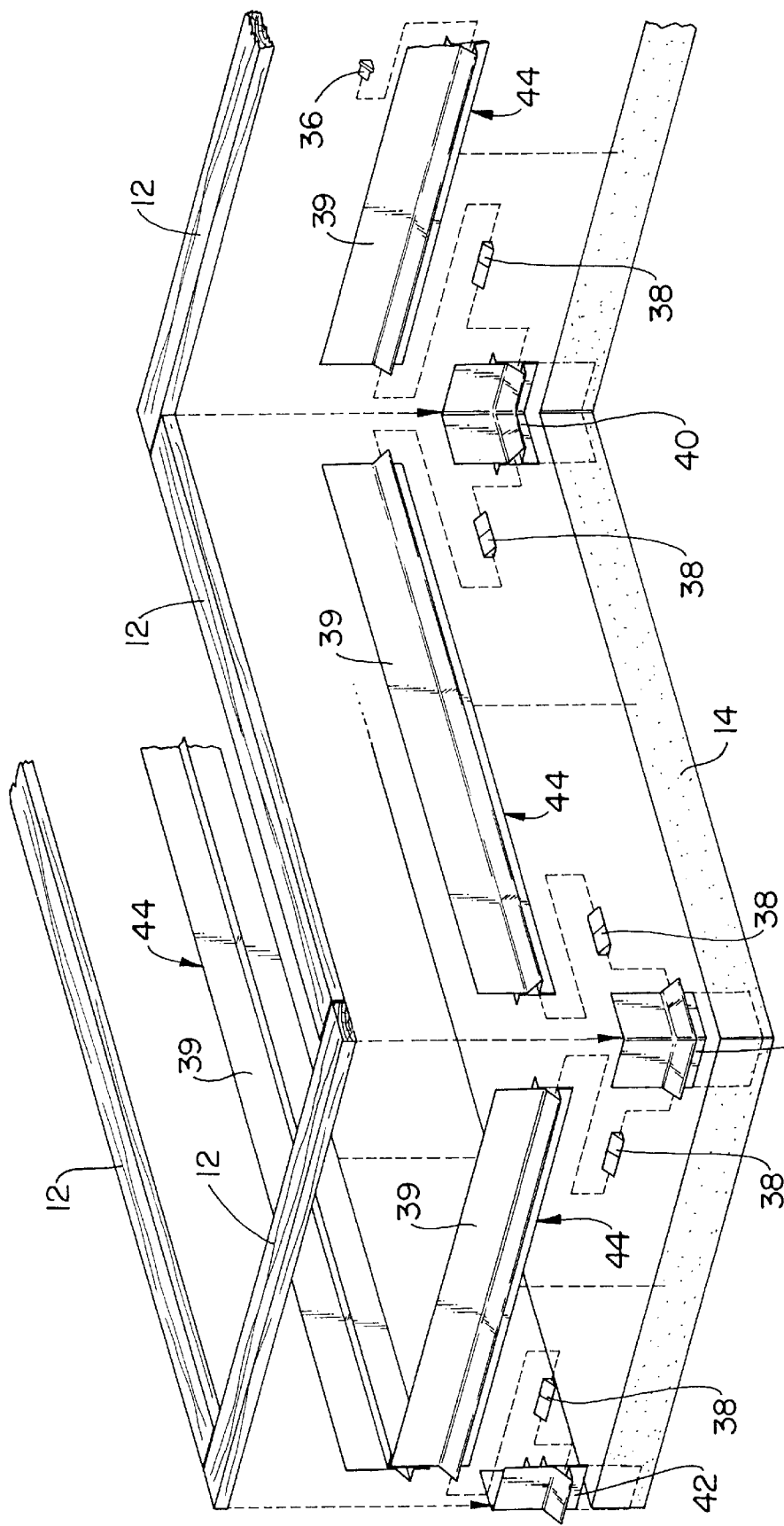
FIG. 7 is an assembly drawing showing the relationship of the components of the shield detailed in FIGS. 1, 3, 4 and 5.

FIG. 7 displays the isometric layout assembly of the shield 44, including straight lengths 39, coupling units 38, inside corner units 40, outside corner units 42, and an end cap unit 36. This figure depicts the slat 14 receiving the shield 44 with all components used in the assembly. The horizontal and vertical edges of the slab 14 have been coated with a sealant 28 before the shield 44 is put into place as set forth above. The expanded view shows the bottom plate 12 to be placed on top of the horizontal flange 32 and against the upstanding section 25 of the shield 44 when the shield components are assembled first on the edge of the foundation 14.

Figure 8:
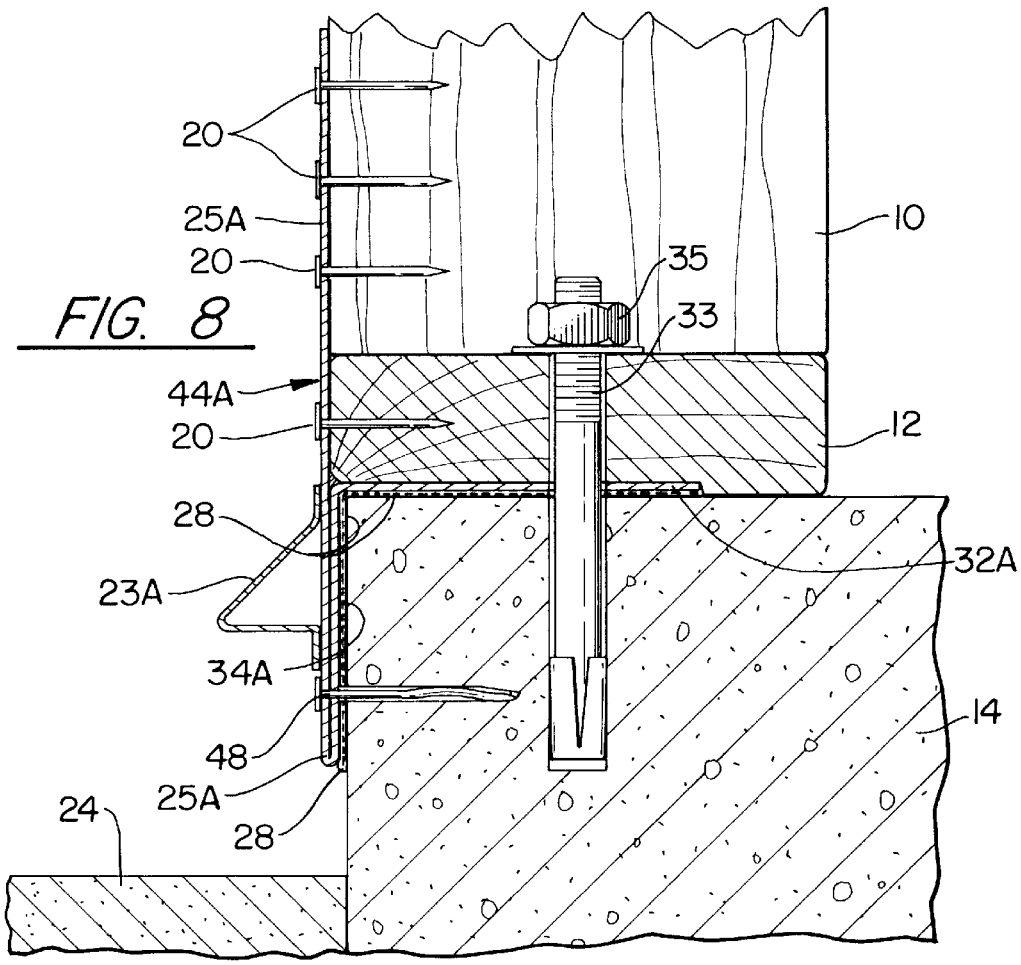
FIG. 8 shows a cross-section of the shield when installed with related components and modified to provide a tie-down function to increase structural integrity against wind loads.
Figure 9:
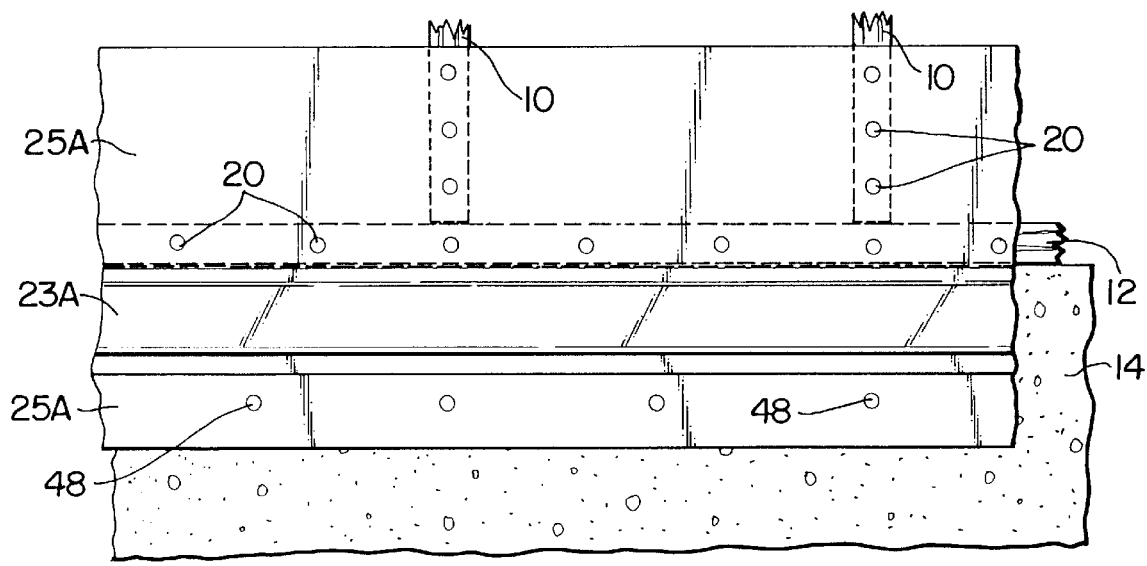
FIG. 9 is a front elevational view of the shield in FIG. 8 indicating the placement of various fasteners by a design practitioner to achieve code compliance for the anchoring of the bottom plate of the shield to the vertical wall studs.

A modification of the invention is shown in FIG. 8 and FIG. 9. The design shape is generally the same as herein disclosed. This modification has an extension of the upstanding section 25A and the horizontal flange 32A and the projecting nose 27A is welded in place instead of having it formed in the total pre-fabricated bend of the shield 44. The section 34A and horizontal flange 32A will be set in a bed of sealant as described above for FIG. 1. This modified shield 44A has the upstanding section 25A extended downwardly to include the vertical section 29 of FIG. 1; this straight section shows significant load strength when fastened to the wood members 10 and 12 with nails 20 through the upstanding section 25A along with concrete pins 48 driven through the bottom extended portion of the upstanding section 25A into the outer edge of the foundation 14. Bottom plate 12 is bolted securely through the horizontal flange 32A into the foundation 14. This arrangement forms a substantial bond between the bottom plate 12 and the foundation 14. The projecting nose 23A will be fastened in the same location as the projecting nose 23 in FIG. 1 and will serve the same function.

While the principles of the invention have now been made clear in illustrative embodiments, it will become obvious to those skilled in the art that many modifications in arrangement are possible without departing from those principles. The appended claims are therefore intended to cover and embrace any such modifications, within the limits of the true spirit and scope of the invention.

I claim:

1. A protective shield adapted to be placed between a wood-to-concrete foundation interface of a building, said shield being formed from a strip of sheet material, the cross-section of said strip having an upstanding section, said upstanding section having a nose section projecting therefrom, the bottom of said nose section having a vertical section extending downwardly therefrom, said vertical section bends inwardly and upwardly against itself forming an upward section ending at a point overlapping the upstanding section above the nose section, at this point the shield bends away from said upward section forming an outstanding flange.

2. A protective shield as set forth in claim 1 wherein the sheet material is sheet metal.

3. A protective shield as set forth in claim 1 wherein the upward section of the shield is spot welded to the upstanding section where they overlap.

4. A protective shield as set forth in claim 1 wherein said nose section has a top slope of approximately 45° extending downwardly from said upstanding section.

5. A protective shield as set forth in claim 1 wherein said vertical section is substantially in line with said upstanding section.

6. A protective shield as set forth in claim 4 wherein said nose section has a bottom horizontal section extending from the slope to said vertical section.

7. A protective shield as set forth in claim 1 wherein said nose section forms an opening to receive a coupling unit for connecting with another shield.

8. A protective shield as set forth in claim 7 wherein said coupling unit is plastic.

9. A protective shield as set forth in claim 7 wherein said coupling unit is fixed in said opening.

10. A method of installing a protective shield as set forth in claim 1 including the steps of:
   (1) placing the upward section against the vertical side of the edge of a concrete foundation;
   (2) placing the outstanding flange against the horizontal side of the edge of a concrete foundation;
   (3) placing a wood plate along the outstanding flange with its side against the upstanding section.

11. A method as set forth in claim 10 including the step:
   (4) applying a sealant on the vertical side of the edge of a concrete foundation and the horizontal side of the edge of a concrete foundation before performing steps (1) and (2).

* * * * *